(12) United States Patent
Rune et al.

(10) Patent No.: US 10,244,499 B2
(45) Date of Patent: Mar. 26, 2019

(54) UE COMPENSATED TIMING ADVANCE

(71) Applicant: Telefonaktiebolaget LM Ericsson (publ), Stockholm (SE)

(72) Inventors: Johan Rune, Lidingö (SE); Rui Fan, Beijing (CN); Andres Reial, Malmö (SE); Claes Tidestav, Bålsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 30 days.

(21) Appl. No.: 15/549,545

(22) PCT Filed: Oct. 28, 2016

(86) PCT No.: PCT/SE2016/051061
§ 371 (c)(1),
(2) Date: Aug. 8, 2017

(87) PCT Pub. No.: WO2018/080364
PCT Pub. Date: May 3, 2018

(65) Prior Publication Data
US 2018/0242268 A1    Aug. 23, 2018

(51) Int. Cl.
*H04W 56/00* (2009.01)
*H04W 36/08* (2009.01)

(52) U.S. Cl.
CPC ......... *H04W 56/004* (2013.01); *H04W 36/08* (2013.01); *H04W 56/001* (2013.01); *H04W 56/0005* (2013.01); *H04W 56/0015* (2013.01); *H04W 56/0045* (2013.01)

(58) Field of Classification Search
None
See application file for complete search history.

(56) References Cited

U.S. PATENT DOCUMENTS

| 6,804,212 | B1* | 10/2004 | Vallstrom | H04W 36/16 370/328 |
| 8,774,126 | B2 | 7/2014 | Kazmi | |
| 2013/0070726 | A1* | 3/2013 | Zhang | H04W 56/0045 370/331 |
| 2014/0233535 | A1* | 8/2014 | Zhao | H04W 72/0453 370/336 |
| 2017/0230875 | A1* | 8/2017 | Tavildar | H04L 5/0048 |

FOREIGN PATENT DOCUMENTS

WO    2011137561 A1    11/2011

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.0.0, Sep. 2016, 1-314.

(Continued)

*Primary Examiner* — Christopher M Crutchfield
(74) *Attorney, Agent, or Firm* — Murphy, Bilak & Homiller, PLLC

(57) ABSTRACT

A method for operating a wireless communications device. The wireless communications device transmits a signal, to a target network node, with a timing that is based on a first timing indication, and a second timing indication associated with the target network node.

18 Claims, 10 Drawing Sheets

(56) References Cited

OTHER PUBLICATIONS

Unknown, Author, "Discussion on Uplink Measurement Based Mobility", 3GPP TSG-RAN WG2 Meeting #95, R2-165213, CMCC, Göteborg, Sweden, Aug. 22-26, 2017, pp. 1-4.

Unknown, Author, "Mobility Based on DL and UL Measurements", 3GPP TSG-RAN WG2 #94, Tdoc R2-163999, Ericsson, Nanjing, China, May 23-27, 2016, pp. 1-3.

Unknown, Author, "NR Uplink Measurement Based Mobility in the Inactive State", 3GPP TSG-RAN2#95bis, R2-167066, Qualcomm Incorporated, Kaohsiung, Taiwan, Oct. 10-14, 2016, pp. 1-5.

* cited by examiner

UE COMPENSATED TIMING ADVANCE

TECHNICAL FIELD

Embodiments herein relate to a wireless communications device, a target network node, and methods therein. In particular they relate to handover and timing advance in a wireless communications network.

BACKGROUND

Wireless communication devices such as terminals are also known as e.g. User Equipments (UE), mobile terminals, wireless terminals and/or mobile stations. These terms will be used interchangeably hereafter.

Wireless communication devices are enabled to communicate wirelessly in a wireless or cellular communications network or a wireless communication system, sometimes also referred to as a cellular radio system or a cellular network. The communication may be performed e.g. between two wireless communications devices, between a wireless communications device and a regular telephone and/or between a wireless communications device and a server via a Radio Access Network (RAN) and possibly one or more core networks, comprised within the cellular communications network.

Access nodes, such as base stations, communicate over the air interface operating on radio frequencies with the wireless communications devices within range of the base stations. In the context of this disclosure, the expression Downlink (DL) is used for the transmission path from the base station to the wireless communications devices. The expression Uplink (UL) is used for the transmission path in the opposite direction i.e. from the wireless communications devices to the base station.

Further, each base station may support one or several communication technologies. Examples of wireless communications technologies are New Radio (NR), Long Term Evolution (LTE), Universal Mobile Telecommunications System (UMTS) and Global System for Mobile communications (GSM).

In a forum known as the Third Generation Partnership Project (3GPP), telecommunications suppliers propose and agree upon standards for networks and investigate enhanced data rate and radio capacity.

Mobility

Mobility is a requirement in many wireless communications networks. A wireless communication network comprising base stations serving cells, may support mobility of a wireless communications device, i.e. service continuity of the wireless communications device, e.g. by transferring a connection between the wireless communications network and the wireless communications device from one cell to another cell or from one base station to another base station, commonly referred to as handover.

Handover

Handover is an important process of any wireless communications network where mobility is supported. With the handover the wireless communications network tries to assure service continuity of a wireless communications device by transferring a connection between the wireless communications network and the wireless communications device from one cell to another cell and/or from one access node to another access node, depending on the technology used. The handover should be executed without any loss of data and with as small interruption as possible.

FIG. 1a illustrates a schematic handover procedure in a prior art wireless communications network 101. The wireless communications network 101 comprises access nodes, including a first base station 111 and a second base station 112. In FIG. 1a a wireless communications device 140 moves away from the coverage of the first base station 111 and into the coverage of the second base station 112. In this scenario a handover of the wireless communications device 140 may be triggered if the wireless communications device 140 experiences a poor performance of a radio link to the first base station 111. For example, the wireless communications device 140 may trigger a handover event if it finds a new cell that is better than it's current cell. Thus, a comparison between the cells may be made. The network may then decide if handover shall be done or not.

When and to what cell and/or access node a handover occurs depends on several factors such as signal strength of reference signals, load conditions in the cells, service requirements of the wireless communications device 140, etc. The provision of efficient/effective handovers, e.g. described by minimum number of unnecessary handovers, minimum number of handover failures, minimum handover delay, etc., would affect not only the QoS of the end user but also the overall capacity and performance of the wireless communications network.

Thus, to enable a handover, it is necessary to find a suitable target cell and its base station, and to ensure that it is possible to sustain reliable communication with that target cell or base station. Candidates for suitable target cells are usually stored in so-called neighbor lists, which are stored in all base stations. To make sure that it is possible to sustain reliable communication with the target cell, the connection quality in the target cell needs to be estimated before the handover may be executed.

Handover in Existing Technology (Standardized in 4G/LTE)

In LTE, handover controlled by the wireless communications network and assisted by the wireless communications device 140 is utilized, for example as described by 3GPP TS 36.300 version 14.0.0. The wireless communications device 140 is moved, if required and if possible, to the most appropriate cell that assures service continuity and quality.

The quality in the target cell may be estimated by measurements related to the wireless communications device 140. Both downlink or uplink measurements may be considered when evaluating the target cell. In legacy wireless communication networks, such as GSM, WCDMA, LTE and WiFi, handover based on downlink measurements has been the most common solution. In those wireless communication networks handover based on downlink measurements is a natural solution as all base stations continuously transmit pilot signals that wireless communications devices in neighbor cells may use to estimate the target cell quality. This leads to that it is possible to estimate the quality of neighbor cells with relatively good accuracy.

With regards to prior art wireless communications networks, e.g. based on LTE, network energy consumption and network load may still be improved. For example, consistently broadcasted reference signals used for handover contributes significantly to the energy consumption and the load of the network.

Further, there is also room for improvements related to delays related to the handover.

5G, i.e. 5th generation mobile networks or 5th generation wireless communication networks, denotes the proposed next major phase of mobile telecommunications standards beyond the current 4G/International Mobile Telecommunications-Advanced standards.

One key design principle currently under consideration for 5G wireless communications networks is to avoid "always on signals", i.e. consistently broadcasted, from the network as much as possible.

Beamforming

In order to overcome a coverage loss that occurs when a carrier frequency increases for 5G networks or systems, arrays of antenna elements may be employed to improve the coverage. This also gives a possibility to beamform a radio signal in certain spatial directions, or radio beams. That is, a radio beam is a radio signal transmitted in a certain direction and with a certain width. In the following, the expression beam will be used interchangeably with the expression radio beam.

DL Measurement Based Handover in Advanced Networks Using Beamforming

As mentioned above, modern wireless communication networks may use advanced antenna systems to a large extent. With such antennas, signals may be transmitted in narrow beams to increase signals strength in some directions, and/or to reduce interference in other directions.

Continuously transmitting pilot signals in all these beams is then less attractive, since it will generate much interference and also increase the base station energy consumption.

During a handover procedure in such a modern wireless communication network, maintenance of good Signal to Noise Ratio (SNR) and high bit rates may require that the wireless communications device 140 is handed over from one beam to another. In addition to a higher pathloss for the NR frequency bands, the higher frequencies also imply a more challenging propagation condition of radio signals in terms of lower diffraction and higher outdoor and/or indoor penetration losses. Thus the suitability of a certain beam may be quite sensitive to rather small movements and even rotations of the wireless communications device 140. Hence, which beam to hand over the wireless communications device 140 to may not be easily determined and to support handover between beams, the wireless communications device 140 has to perform a beam finding procedure. During such a beam finding procedure the radio access nodes that are potential target nodes for the handover, i.e. candidate access nodes, transmit DL beams identified by downlink signals, e.g. synchronization and/or reference signals, for the wireless communications device 140 to measure on. The beams are typically sequentially transmitted in a manner usually referred to as a beam sweep. The beam sweep may be continuously repeated or activated on demand. The wireless communications device 140 searches for the signals transmitted in the beams in the beam sweep and measures their respective quality. The beam with the best measured quality is typically selected as the target for the handover.

UL Measurement Based Handover

In a wireless communication network with advanced antennas, it becomes more attractive to rely on uplink measurements. Even wireless communication networks of today may rely on uplink measurements. For example, the wireless communications device 140 may transmit some uplink signal and several network nodes measure on that signal. The uplink signal may be a sounding signal, a reference signal or a combined synchronization and reference signal.

One reason that makes the UL measurement based handover more attractive in wireless communication networks with advanced antennas, capable of and, in high frequencies, relying heavily on advanced beamforming, is the difference in the UL and DL link budget. Since an access network node, such as the first base station 111 or the second base station 112, typically has more antennas and more advanced antenna configurations and a more advanced receiver than the wireless communications device 140, the receiver gain in the access network node is higher than in the wireless communications device 140. This makes the link budget more favorable in the uplink. For this reason, beamforming of the received uplink signal used for UL measurement based handover is not as crucial as for DL measurement based handover using DL beam sweeps as described above.

Typically, a single omnidirectional uplink signal transmission or possibly a beam sweep consisting of a few wide UL beams suffices to reach and provide a measurement opportunity for all the candidate access network nodes, since the beamforming gain is provided by the access network node, such as the second base station 112.

An UL measurement based handover may start by initiating uplink signal transmission from the wireless communications device 140, so that the candidate access nodes may measure on these uplink transmissions. The measurements of the quality of the received UL signal from the wireless communications device 140 from all the relevant cells and/or access nodes are collected and compared. Then the network decides on a suitable target cell and/or access node and the decision is communicated to the wireless communications device 140.

Timing Advance Acquisition

In many wireless communication networks it may be necessary for efficient operation that the transmissions from multiple wireless communications devices arrive at the access node, such as the first base station 111, in a synchronized manner. To enable such reception synchronicity, each wireless communications device has to take the propagation delay between the wireless communications device and the access node, or more precisely: the antenna(s) of the base station 111, into account when transmitting in the uplink.

The reference that the wireless communications device 140 uses when determining the timing of its uplink transmission is the timing, i.e. synchronization, of receptions of downlink signals. The UL transmission timing may be calculated by applying a so called Timing Advance (TA) to the downlink reception timing, such that uplink transmissions are initiated a time TA before the reference downlink synchronization, thereby ensuring that the uplink transmissions arrive at the first base station 111, e.g at the antenna site, at the expected times, e.g. aligned with frame and/or subframe and/or timeslot borders of the base station 111. The TA may be defined as the propagation delay between the base station and the wireless device and back to the base station again, i.e. TA=PDL+PUL where PDL is the downlink propagation delay and PUL is the uplink propagation delay.

To calculate the proper timing advance for the wireless communications device 140 which depends on its current position and distance to the base station, the base station 111 and the wireless communications device 140 need to cooperate, e.g. as follows. The typical way is to use a so-called random access (RA) procedure. Using UL transmission resources allocated for this purpose the wireless communications device 140 transmits an UL signal, often referred to as a random access preamble, that is easily detected, due to good correlation properties, by the receiving base station.

The wireless communications device 140 uses receptions of downlink transmissions from the base station 111 to determine the timing of the transmission of the UL signal. The first base station 111 measures the time of reception of the uplink signal in relation to the ideal timing. For example in relation to frame/subframe/timeslot borders. The ideal timing is e.g. the expected timing when the propagation delay is zero.

Based on this measuring, the first base station 111 calculates the appropriate TA for the wireless communications device 140 to use for subsequent uplink transmissions and communicates this TA to the wireless communications device 140, e.g. in a Random Access Response message.

The first base station 111 may subsequently measure the reception timing of further UL transmissions from the wireless communications device 140 and based on this continuously adapt the TA of the wireless communications device 140 using control signaling.

FIG. 1b illustrates how the wireless communications device 140 takes the propagation delay between the wireless communications device 140 and an access node, such as the first base station 111, into account when transmitting in the uplink.

First the first base station 111 sends 101 a synchronization signal. The wireless communications device 140 obtains time synchronisation with respect to the first base station 111 with delay T due to the propagation delay between the wireless communications device 140 and the first base station 111. Time synchronisation is also referred to as synchronisation and sometimes also referred to as DL synchronisation herein.

Obtaining time synchronisation with the first base station 111 means that the wireless communications device 140 obtains information that allows it to accurately know when a start of a symbol and a start of a subframe and/or a Transmission Time Instant (TTI) occurs in received DL transmissions. For example, in order to obtain synchronisation with a DL transmission, the communication device 240 may search for a known signal pattern, e.g. a symbol or sequence of symbols, in the received radio signal by correlating the known signal pattern with the received radio signal so that a location of a correlation peak in a time domain may be determined, e.g. with sufficient accuracy.

The wireless communications device 140 may then adjust its internal timing to match the timing of the first base station 111. This may further be referred to as the communication device 140 follows the timing of or a timing reference associated with the first base station 111.

Then the wireless communications device 140 sends 102 a random access preamble with a timing of the first base station 111 after a predefined time interval P1. For example, the wireless communications device 140 may send the signal such that a start of a symbol and a start of a subframe and/or a TTI is aligned with the start of the symbol and the start of the subframe and/or the TTI in received DL transmissions. This may also be described such that the communication device 140 follows the timing or a timing reference of the first base station 111.

P1 may be configured in the wireless communication device 140 by the first base station 111. But the wireless communication device 140 may also acquire this information from system information broadcast by the second base station 112.

The random access preamble arrives at the first base station 111 with an offset corresponding to 2*T from the reference timing at the first base station 111.

The first base station 111 estimates 103 a TA based on the offset. The first base station 111 signals the TA to wireless communications device 140.

The wireless communications device 140 applies 104 the received TA to its transmission timing.

The wireless communications device 140 sends 105 data after time interval P2-TA, and the data arrives at the first base station 111 with a correct reference timing, i.e. with the reference timing of the first base station 111.

The wireless communications device 140 typically has to perform a random access procedure in conjunction with initial network access, including transition from an energy saving state, e.g. idle mode, to a connected/active state, after a handover to a new cell and/or base station. The same applies when the wireless communications device 140 has gone long enough without transmitting in the uplink to risk having lost its uplink synchronization, i.e. the TA cannot be trusted as valid anymore, which may occur due to movements of the wireless communications device 140.

SUMMARY

As mentioned above, after or in conjunction with a handover to a new cell and/or access node the wireless communications device 140 has to acquire a valid timing advance to be used for UL transmissions in the new cell and/or access node. Following the principles of regular random access procedures illustrated in FIG. 1b above, the target access node may calculate timing advance associated with the wireless communications device 140 based on the reception timing of the random access preamble and may send the TA to the wireless communications device 140 in response to the USS.

However, the regular random access principles may not be used for TA calculation for some procedures. A variant of an UL measurement based handover procedure will now be described to illustrate a problem associated with currently known procedures. As mentioned above, the wireless communications device 140 may transmit an uplink signal, e.g. similar to the random access preamble denoted Uplink Synchronization Signal (USS) and several network nodes may measure on that signal. The uplink signal may be a sounding signal, a reference signal or a combined synchronization and reference signal.

The uplink signal from the wireless communications device 140 may be the signal similar to the random access preamble denoted USS. A handover command may be sent from a selected target access node in the form of a combined time/frequency synchronization and reference signal, e.g. denoted Mobility and access Reference Signal (MRS). It may be followed by a message comprising possible configuration data and possibly an uplink resource allocation for the wireless communications device 140 to use for uplink transmission of control or user plane data. Alternatively, the MRS and the subsequent message may be combined in a manner such that the message has its own integrated synchronization signal and demodulation reference signals.

In the above scenario, the wireless communications device 140 may not be able to transmit the USS using the timing of the target cell and/or access node, since it does not know which the target cell and/or access node is and the wireless communications device 140 doesn't know the timing of the target cell and/or access node. This is especially true if there are multiple candidate cells and/or access nodes with mutually different synchronizations. This is particularly problematic when the access nodes are not accurately synchronized, e.g. down to a small fraction of the Orthogonal Frequency Division Multiplexing (OFDM) symbol length in case OFDM is used in the network, which will be the case in many deployments. The problem is also aggravated when no continuous DL pilot signals are available.

As a consequence, the wireless communications device 140 has to transmit a second uplink signal, e.g. an USS, after receiving the response, e.g. a handover command and/or synchronization signal, from the target cell and/or access node (i.e. in principle use the regular random access way to acquiring a correct timing advance). This additional uplink transmission prolongs the handover procedure and adds delay to the handover procedure, thereby counteracting the benefits of the UL measurement based handover approach.

In addition, allocation of uplink transmission resources for the second uplink signal, e.g. USS, further complicates the handover preparations as more complex configuration of the wireless communications device 140 and the candidate access nodes is needed. This potentially adds further delay and/or wastes UL radio resources.

An object of embodiments herein is to improve the performance of one or more wireless communications networks comprising access nodes and of a wireless communications device by obviating at least some of the above mentioned problems. It may be an object of embodiments herein to reduce the load of a wireless communications network. It may further be an object of embodiments herein to reduce delays related to the handover mentioned above.

According to a first aspect of embodiments herein it is provided a method for operating a wireless communications device.

The wireless communications device transmits a signal, to a target network node, with a timing that is based on:
a first timing indication, and
a second timing indication associated with the target network node.

According to a second aspect of embodiments herein it is provided a wireless communications device configured to:
transmit a signal, to a target network node, with a timing that is based on:
a first timing indication, and
a second timing indication associated with the target network node.

According to a third aspect of embodiments herein it is provided a method for operating a network node.

The network node receives an indication of a second propagation delay associated with the wireless communications device and a target network node.

The indication may be received from the wireless communications device.

Thereby the network node is enabled to use the received indication of the second propagation delay in place of an indication of a first propagation delay associated with the wireless communications device.

According to a fourth aspect of embodiments herein it is provided a network node configured to receive an indication of a second propagation delay, associated with the wireless communications device and a target network node.

The network node may be configured to receive the indication from the wireless communications device.

Thereby the network node is enabled to use the received indication of the second propagation delay in place of an indication of a first propagation delay associated with the wireless communications device.

Since the wireless communications device transmits the signal with the timing that is based on the first timing indication and based on the second timing indication associated with the target network node, the wireless communications device does not have to transmit a second uplink signal, after receiving the response from the target network node.

By employing any of the above-described aspects the handover procedure may be shortened and/or the amount of control signalling may be reduced.

BRIEF DESCRIPTION OF THE DRAWINGS

Examples of embodiments herein are described in more detail with reference to attached drawings in which.

DETAILED DESCRIPTION

Briefly described, embodiments are provided herein that may be used to reduce delays and/or to reduce the amount of control signalling in a handover procedure of a wireless communications device to a target network node. This may be accomplished when the wireless communications device transmits a signal to the target network node with a timing that is based on a first timing indication and a second timing indication associated with the target network node. Some examples of how the first and second timing indications may be realized will be described below.

Figure 1A:
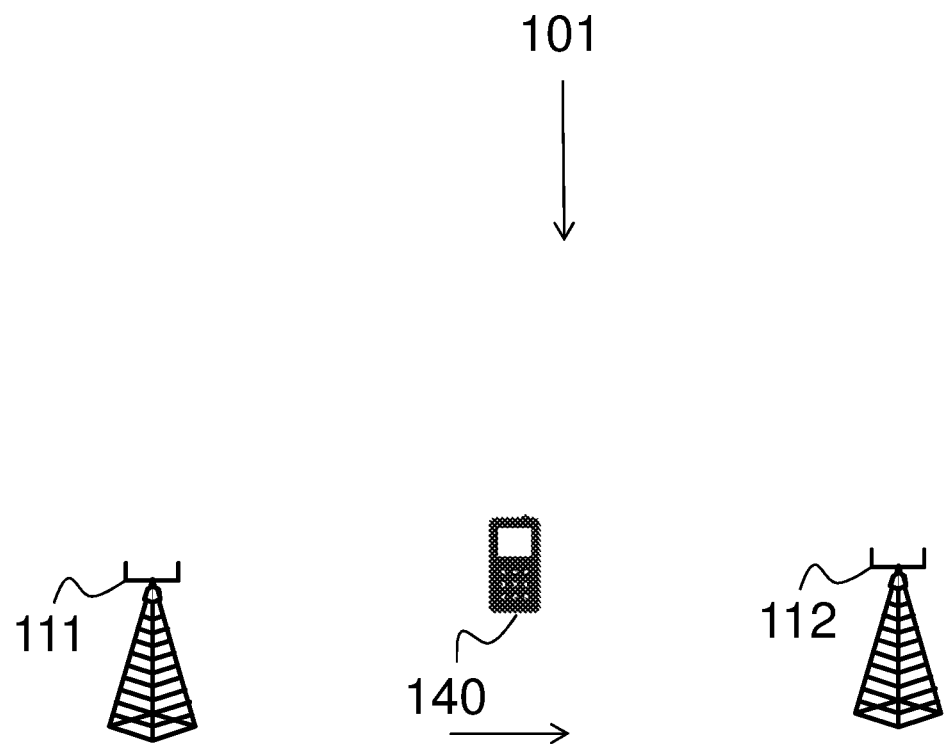
FIG. 1a is a schematic block diagram illustrating a prior art wireless communications network.
Figure 1B:
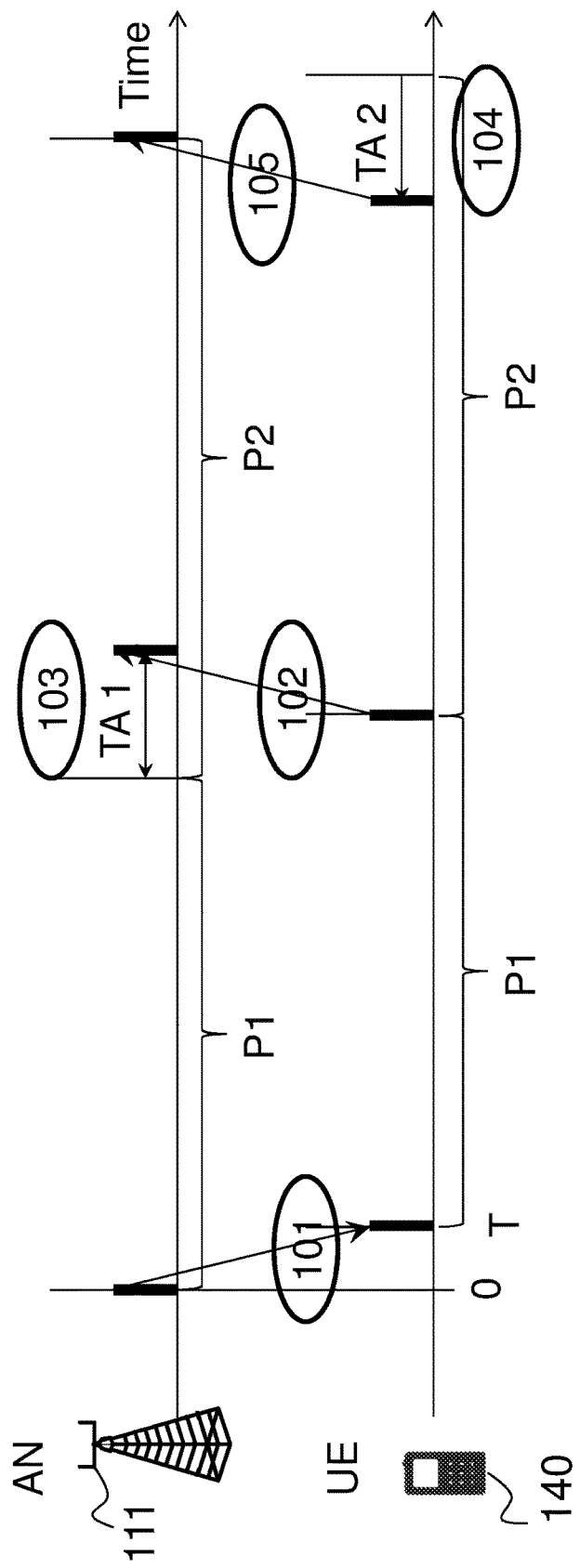
FIG. 1b is a schematic block diagram illustrating timelines and the concept of timing advance.
Figure 2:
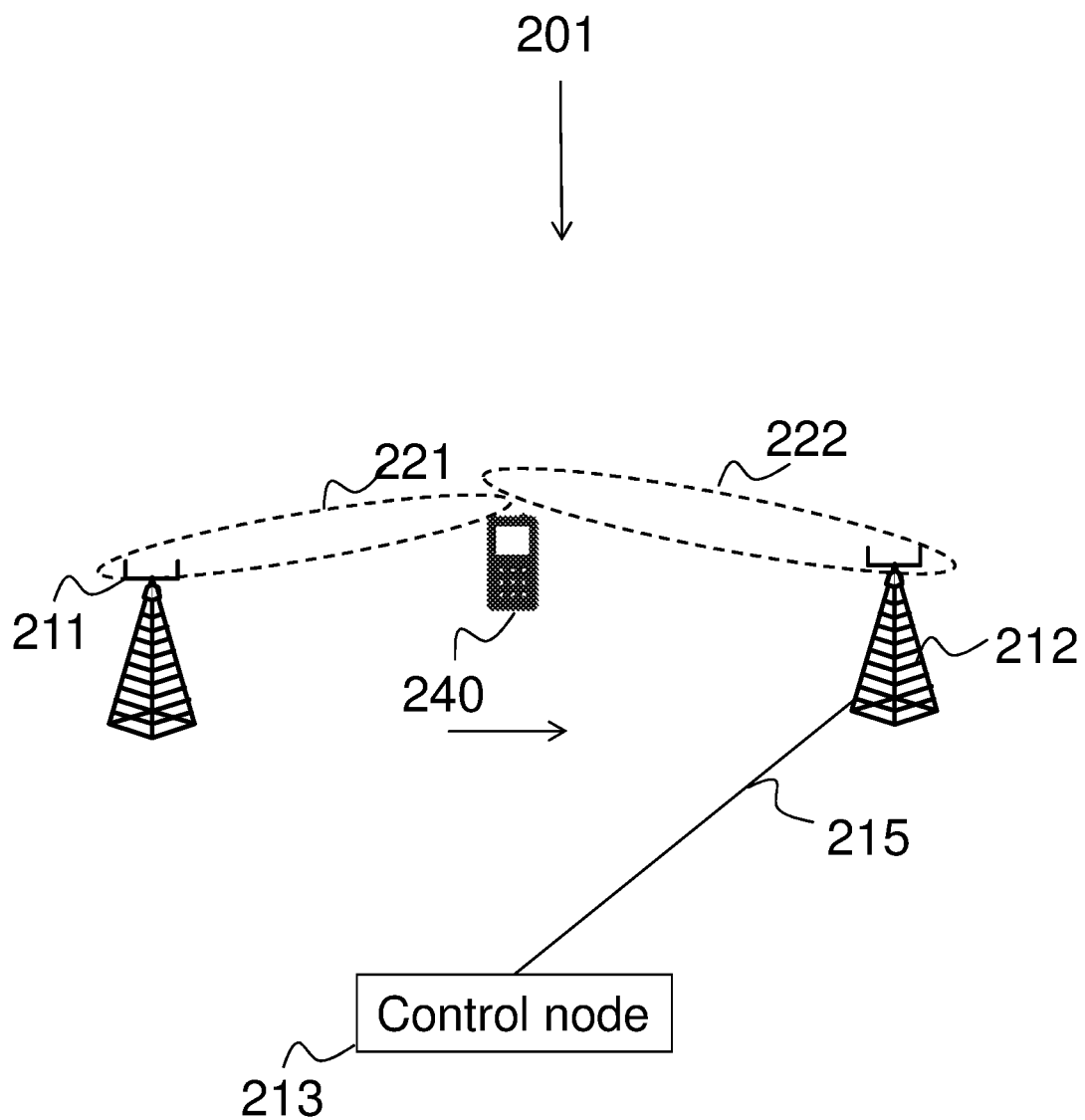
FIG. 2 is a schematic block diagram illustrating a wireless communications network.

Embodiments herein may be implemented in one or more wireless communications networks. FIG. 2 depicts parts of such a wireless communications network 201. The wireless communications network 201 may for example be a 5G/New Radio (NR), any 3GPP or any cellular wireless communications network or system that make use of UL based mobility. 5G/NR will hereafter be used to exemplify the embodiments although the embodiments are thus not limited thereto.

The wireless communications network 201 comprises a plurality of base stations and/or other network nodes. More specifically, the wireless communications network 201 comprises a source network node 211, 212, such as a source access node.

The term "access node" may correspond to any type of radio network node or any network node which communicates with at least a radio network node. For example, the source network node 211, 212 may be a base station, such as an eNB. The base station may also be referred to as a NodeB, an evolved Node B (eNB, eNode B), a base transceiver station (BTS), Access Point (AP) Base Station, Wi-Fi AP, base station router, or any other network unit capable of communicating with a wireless communications device within a coverage area served by the base station depending e.g. on the radio access technology and terminology used. The term "access node" may also denote a network node or unit capable of controlling one or more other network units which are capable of communicating with a wireless communication device. Such a network node may e.g. be a Radio Network Controller (RNC), a Master eNB, a centralized baseband unit, a Centralized RAN (C-RAN) or a cluster head. Such a network node or unit may also be capable of communicating with a wireless device via one or more network units which are capable of communicating with a wireless device via a radio interface.

The wireless communications network 201 further comprises a target network node 212.

In some scenarios herein the source network node 211, 212 may be the same network node as the target network node 212. This may for example be the case for a handover between two cells or radio beams served by the same network node. A cell is a geographical area where radio coverage is provided by network node equipment such as Wi-Fi AP equipment, base station equipment at a base station site or at remote locations in Remote Radio Units (RRU). The source network node 211, 212 and the target network node 212 may be examples of such network node equipment.

In embodiments herein radio beams may have a similar function as the cells described above. For example, the source network node 211, 212 may provide radio coverage with a source beam 221 and the target network node 212 may provide radio coverage with a target beam 222.

The wireless communications network 201 may further comprise a network control node 213. The network control node 213 may e.g. be an RNC or an Mobility Management Entity (MME). The network control node 213 may communicate with the target network node 212, e.g. over an interface 215.

In embodiments herein the source network node 211, 212 serves wireless communications devices, such as a wireless communications device 240, which could also be referred to as a UE herein. The source network node 211, 212 may communicate with the wireless communications device 240 over a radio link.

The wireless communications device 240 may further be e.g. a mobile terminal or a wireless terminal, a mobile phone, a computer such as e.g. a laptop, a Personal Digital Assistants (PDAs) or a tablet computer, sometimes referred to as a surf plate, with wireless capability, target device, device to device UE, Machine Type Communication UE or UE capable of machine to machine communication, iPAD, mobile terminals, smart phone, Laptop Embedded Equipment (LEE), Laptop Mounted Equipment (LME), USB dongles etc. or any other radio network units capable to communicate over a radio link in a wireless communications network.

It should further be noted that the term User Equipment used in this disclosure also covers other wireless devices such as Machine to machine (M2M) devices, even though they are not operated by any user.

In embodiments herein the expressions network node, handover between network nodes and synchronization related to network nodes are used. However, in most cases the term network node may be replaced by related concepts, such as cell, sector, link, base station, access node, access point or Transmission/Reception Point (TRP).

It should be noted that embodiments below are not mutually exclusive. Components from one embodiment may be tacitly assumed to be present in another embodiment and it will be obvious to a person skilled in the art how those components may be used in the other exemplary embodiments.

Figure 3:
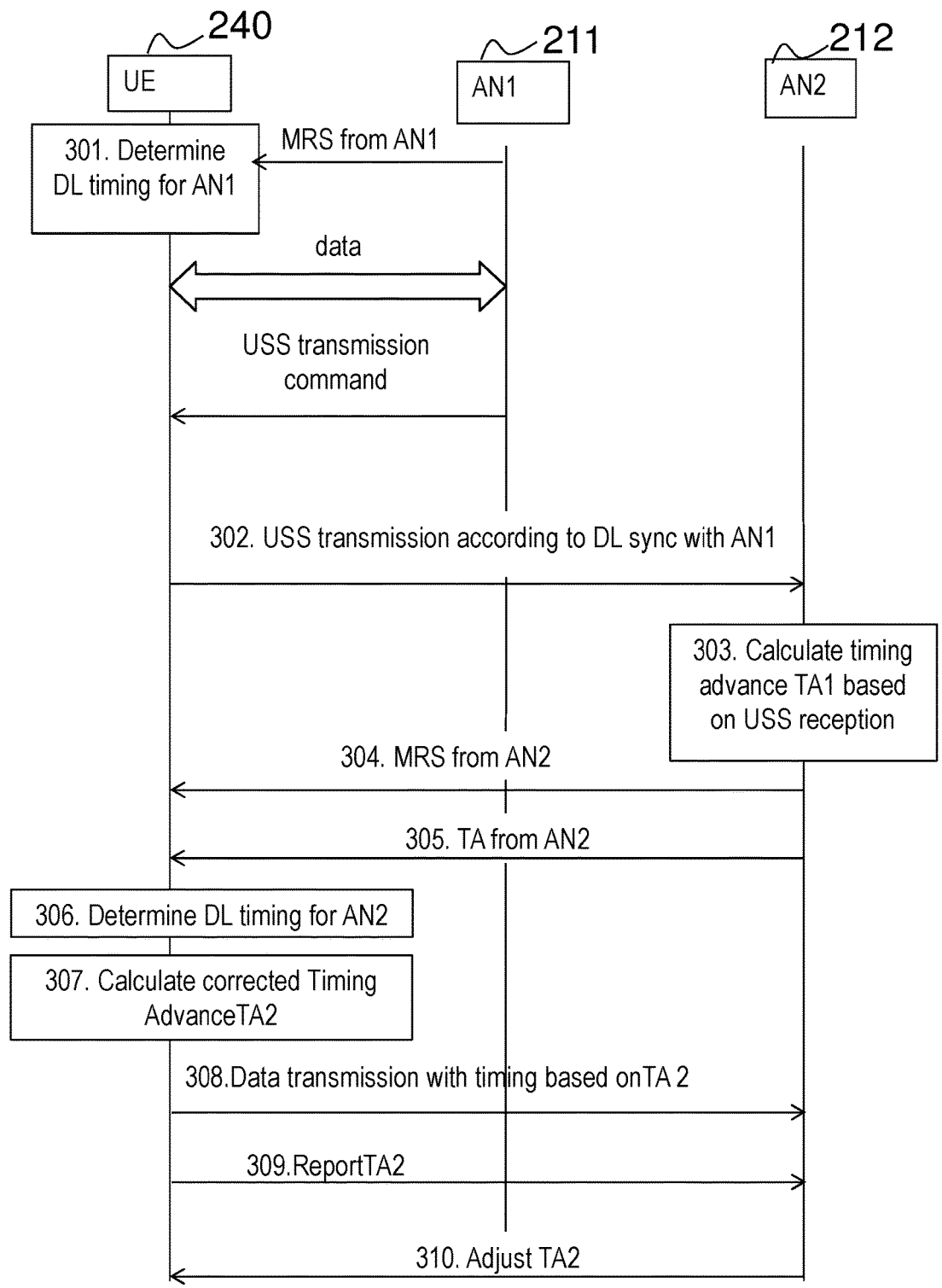
FIG. 3 is a combined flowchart and sequence diagram illustrating embodiments of a method.

Embodiments will firstly be described by describing the interactions of the wireless communications device 240 with the source and target network nodes 211, 212 with reference to a combined signalling diagram and flow chart illustrated in FIG. 3 and with continued reference to FIG. 2.

In an example scenario in which embodiments herein may be applied the wireless communications device 240 may be moving in a direction away from the source access node 211, which is indicated by the arrow in FIG. 2. Thus in this scenario the wireless communications device 240 is in need for handover evaluation.

Handover may be performed between e.g. the source network node 211, 212 and the target network node 212. Handover may also be performed between cells and/or radio beams e.g. operated or served by the source network node 211, 212 and the target network node 212.

In a further scenario herein the transmission of uplink signals, such as signals for synchronisation, follows the DL timing of the source network node 211, 212, while, for a correct timing advance, it should follow or be tied to the yet unknown DL timing of the target network node 212.

As mentioned above, following the timing, such as the DL timing, of the source network node 211, 212 means that the wireless communications device 240 transmits the uplink signals such that a start of a symbol and a start of a subframe and/or a TTI is aligned with a start of a symbol and a start of a subframe and/or a TTI in received DL transmissions. In order to be able to transmit the uplink signals with the timing of the source network node 211, 212, the wireless communications device 240 may obtain a timing reference associated with the source network node 211, 212 from the reception of downlink signals. For example, the timing reference may be obtained from the start of the symbol and the start of the subframe and/or the TTI in received DL transmissions. As a purely illustrative example, the timing reference may be a certain symbol or sequence of symbols or a certain subframe. In a RAT with a different structure of the physical layers, there may be other time related borders that the wireless communications device 240 with DL synchronization will have accurate knowledge of.

To overcome the above described problems some embodiments herein leverages the fact that the wireless communications device 240 has synchronization parameters, in particular a DL timing reference, available w.r.t. the source network node 211, 212 prior to the USS transmission and subsequently, after receiving the response from the target network node 212, also w.r.t. the target network node 212. This enables the wireless communications device 240 to compensate for the error in the timing advance received from the target network node 212.

When the handover procedure begins the wireless communications device 240 has DL synchronization with the source network node 211, 212, i.e. the wireless communications device 240 follows the DL timing of the source network node 211, 212.

As mentioned above, this may for example mean that the wireless communications device 240 is aware of the timing, such as the DL timing, of the source network node 211, 212. It may further mean that the wireless communications device 240 may transmit signals, such as data and control signals, in the UL based on the DL timing of the source network node 211, 212.

Generally, the uplink signals from the wireless communications device 240 does not have to be transmitted synchronized with the DL timing of the source network node 211, 212. The uplink signal may be transmitted using any timing that is close enough to the correct DL timing of the source network node 211, 212 to enable reception of the uplink signal. E.g. the uplink signals may arrive at least partly, but preferably fully within the reception window used by the target network node 212. Any timing fulfilling this condition may be used.

Action 301

Initially, the wireless communications device 240 may have obtained DL synchronization with the source network node 211, 212 through a DL synchronization signal transmitted by the source network node 211, 212, possibly as a part of or combined with a reference signal, such as an MRS.

Figure 4:
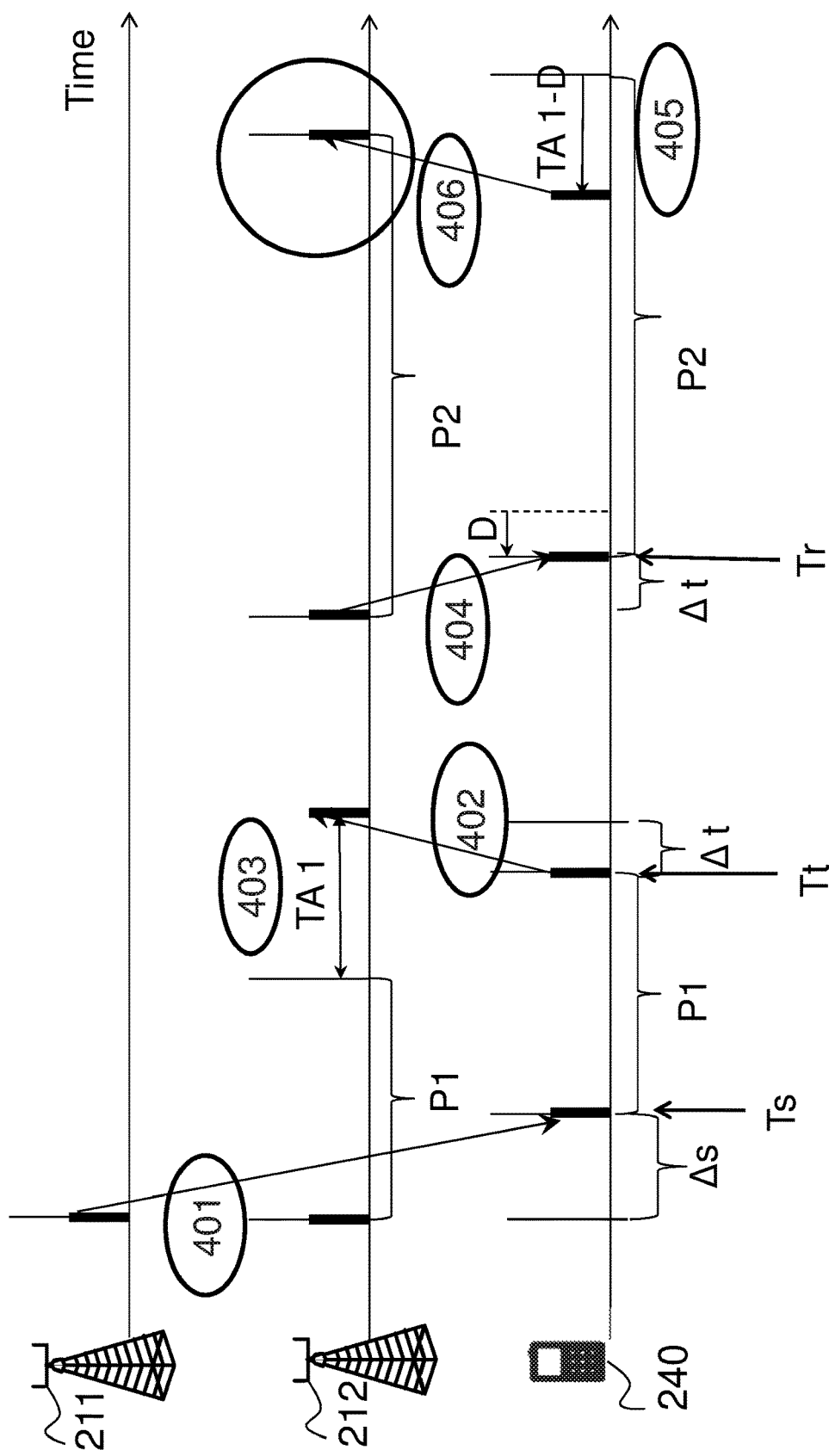
FIG. 4 is a schematic block diagram illustrating timelines and embodiments herein.

For example, in FIG. 4 the wireless communications device 240 obtains synchronisation with respect to the source network node 211, 212 with a delay $\Delta s$. The delay $\Delta s$ corresponds to a propagation delay of the DL synchronisation signal between the source network node 211, 212 and the wireless communications device 240.

For example, the wireless communications device 240 may obtain a timing indication which is associated with the source network node 211, 212. The timing indication may e.g. be associated with the DL timing of the source network node 211, 212.

Examples of the timing indication may comprise e.g. a number of:
- a reference time point
- a number of symbols, subframes and/or time slots and/or OFDM symbols and/or time units, such as TTIs
- an indication of a subframe and/or time slot and/or OFDM symbol and/or time unit within a sequence of subframes and/or time slots and/or OFDM symbols.

The timing indication may comprise information representing the timing of the source network node 211, 212, such as the DL timing of the source network node 211, 212. For example, the timing indication may comprise information representing a first timing reference associated with a time of reception Ts of the first DL signal. The time of reception Ts of the first DL signal may pertain to a subframe or TTI and/or an OFDM symbol and/or a radio frame and/or a slot and/or a mini-slot and/or time instance, such as a TTI. From the first DL signal and the time of its reception the wireless communication device 240 may learn the borders between different subframes or TTIs and/or the borders between OFDM symbols.

Subsequently the wireless communications device 240 may have maintained this DL synchronization with the source network node 211, 212 by receiving reference signals, such as CSI-RS, MRS or other reference signals, or through repeated receptions of the synchronization signal. As mentioned above, having DL synchronization with the source network node 211, 212, may e.g. mean that the wireless communications device 240 accurately knows when the start of the symbol and the start of the subframe/TTI occurs in received DL transmissions from the source network node 211, 212. Thus this is one example of the timing indication which is associated with the source network node 211, 212.

In order to obtain synchronisation with the DL transmission the communication device 240 may search for a known signal pattern, e.g. a symbol or sequence of symbols, in the received radio signal by correlating the known signal pattern with the received radio signal so that a location of a correlation peak in a time domain may be determined, e.g. with sufficient accuracy.

This action is related to action 501 below.

Action 302

The wireless communications device 240 uses the DL synchronization with the source network node 211, 212 to time the transmission of the USS, e.g. by aligning it with the frame/subframe/timeslot boundaries of the source network node 211, 212, even though it is targeting the target network node 212.

For example, in FIG. 4 the wireless communications device 240 sends an USS with a timing that is synchronised to the source network node 211, 212 after time interval P1. For example, the wireless communications device 240 may send the USS such that the start of the symbol and the start of the subframe and/or the TTI is aligned with the start of the symbol and the start of the subframe and/or the TTI in received DL transmissions from the source network node 211, 212. This may also be referred to as the communication device 140 follows the timing or the timing reference of the source network node 211, 212.

The USS arrives at the target network node 212 with an offset P1+$\Delta s$+$\Delta t$ from the reference timing of the source network node 211, 212. $\Delta t$ corresponds to the propagation delay of the DL synchronisation signal between the target network node 211, 212 and the wireless communications device 240. $\Delta s$ corresponds to a propagation delay between the wireless communications device 240 and the source network node 211, 212.

As mentioned above, the uplink signal does not have to be transmitted based on, or based solely on, the DL timing of the source network node 211, 212. The uplink signal may be transmitted using any timing that is close enough to the correct DL timing of the target network node 212 to enable reception of the USS. E.g. the USS may arrive at least partly, but preferably fully within the reception window used by the target network node 212. Any timing fulfilling this condition may be used.

As long as the wireless communications device 240 remembers the timing of its USS transmission, it may, when it has received the MRS, or another response comprising the synchronization signal, from the target network node 212, and obtained DL synchronization with the target network node 212, count the timeslots backwards and determine how much the USS transmission timing deviated from the DL timing of the target network node 212. The timing of the USS transmission may e.g. be the start of the symbol and the start of the subframe and/or the TTI or the timeslot in which the USS transmission is started. I.e. The wireless communications device 240 may determine the deviation from the transmission timing that the wireless communications device 240 may have used, if it had had DL synchronization with the target network node 212 at the time of transmitting the USS. That is, if the wireless communications device 240 had had DL synchronization with the target network node 212, it would have transmitted the USS at the start of the timeslot/TTI/subframe/symbol in accordance with said DL synchronization.

Since the timeslot boundaries of the radio interface of the target network node 212 are repetitively occurring, one boundary after and/or before each timeslot, the wireless communications device 240 may calculate the difference between the remembered time of transmitting the uplink signal and the closest timeslot boundary. This difference represents the error that the wireless communications device 240 compensates for when the target network node 212 calculated the timing advance based on the assumption that this error was zero.

This action is related to actions 502 and 701 below.

Action 303

The target network node 212 calculates a timing advance for the wireless communications device 240 in the usual way, i.e. as if the USS had been transmitted using the DL synchronization of the target network node 212.

This action is related to action 702 below.

Action 304

The target network node 212 may let the received USS serve as a Random Access (RA) preamble, e.g. RA Msg1. As a consequence the target network node 212 may send an MRS to the wireless communications device 240. Instead of the MRS the target network node 212 may send another signal which provides synchronization possibility and demodulation reference symbols. To enable synchronization, such another signal may include, be prepended by, be integrated with or otherwise be transmitted in conjunction or together with a synchronization signal, symbol or sequence. The signal may have the form of a message similar to a Random Access Response (RAR) message and/or a radio resource reconfiguration message, or may be followed by such a message, as described in action 305.

This action is related to action 703 below.

Action 305

The target network node 212 may further send a response message, e.g. similar to the RAR message or the response message with integrated synchronization and demodulation reference signals. The response message may include the timing advance for the wireless communications device 240. As mentioned above the target network node 212 may have calculated the timing advance in the usual way.

In some embodiments the target network node 212 sends the timing advance before sending the MRS in action 304. As indicated above, in some other embodiments the target network node 212 sends the timing advance and the synchronization and demodulation reference signals, such as the MRS, in a combined message. The combined message may also comprise radio resource (re-)configuration data, e.g. to configure a Radio Resource Control (RRC) connection or a similar connection between the wireless communication device 240 and the target network node 212.

This action is related to actions 504 and 704 below.

Action 306

After having received the MRS or the other signal providing synchronization possibilities from the target network node 212, the wireless communications device 240 obtains DL synchronization with the target network node 212.

Thus, now the wireless communications device 240 has obtained DL synchronization with both the source network node 211, 212 and the target network node 212.

This action is related to action 503 below.

Action 307

The wireless communications device 240 knows that the received timing advance was calculated based on the assumption that the USS was transmitted based on the DL synchronization of the target network node 212, while in fact the USS was transmitted based on the DL synchronization of the source network node 211, 212. Therefore the wireless communications device 240 may modify the timing advance.

For example, in some embodiments herein the wireless communications device 240 modifies or corrects the timing advance with the difference between the DL synchronization of the source network node 211, 212 and the DL synchronization of the target network node 212.

For example, $TA_{actual} = TA_{received} - D$ where $TA_{actual}$ is the modified timing advance, $TA_{received}$ is the received timing advance and D is the difference between the DL synchronization of the source network node 211, 212 and the DL synchronization of the target network node 212.

In other words, the wireless communications device 240 may calculate a difference of the reference timing associated with the source network node 211, 212 and the reference timing associated with the target network node 212. The time difference may be expressed in e.g. microseconds, a combination of milliseconds, microseconds and/or nanoseconds, a number of subframes and/or time slots and/or OFDM symbols and/or fractions of OFDM symbols or any suitable way that represents this time difference.

In some embodiments the time difference is calculated as the actual time of transmission, which may be based on and aligned with the DL synchronization of the source network node 211, 212 as perceived by the communication device 240, minus the ideal uplink signal transmission time, i.e. the time of transmission if it had been based on and aligned with the DL synchronization of the target network node 212 as perceived by the communication device 240. That is, in other words the time difference D may be expressed as the actual time of transmission of the uplink signal minus the ideal time of transmission of the uplink signal. The modified or corrected timing advance, $TA_{actual}$, may then replace the received timing advance in relation to the DL synchronization of the target network node 212.

This action is related to action 505 below.

Action 308

The wireless communications device 240 transmits a signal to the target network node 212 with a timing $TA_{received} - D$ that may be based on the obtained DL synchronisation with the source network node 211, 212 and on the obtained DL synchronisation with the target network node 212 and on the incorrect timing advance received from the target network node 212. For example, the wireless communications device 240 may transmit the signal with a timing based on the corrected timing advance, $TA_{actual}$, which the wireless communications device 240 calculated in action 307 above.

The transmitted signal may e.g. be a data signal or a control signal.

By transmitting the signal with the timing as described above it is possible to avoid undesirable delays associated with a second uplink signal from the wireless communications device 240 in order to derive and acquire a valid timing advance. It is further possible to avoid increased complexity in a configuration of handover preparation otherwise associated with additional USS allocation and receiver resource reservation.

This action is related to action 506 below.

Action 309

Optionally, the wireless communications device 240 may then inform the target network node 212 of the modified timing advance, so that the target network node 212 is aware of the absolute value of the timing advance the wireless communications device 240 is using, i.e. $TA_{actual}$. This knowledge may potentially be useful, e.g. when estimating the position of, or distance to, the wireless communications device 240.

This action is related to actions 602 and 705 below.

Some embodiments will now be described by describing the interactions of the wireless communications device 240 with the source and target network nodes 211, 212 with reference to FIG. 4, which illustrates a timing of the signalling. In FIG. 4 there are 3 timelines, one for the source network node 211, 212, one for the target network node 212 and one for the wireless communications device 240.

In FIG. 4 the source network node 211, 212 and the target network node 212 are perfectly synchronized in order to make the figure easier to interpret. The perfect synchronization is illustrated in that the timelines of the source network node 211, 212 and of the target network node 212 have been aligned.

Action 401

The source network node 211, 212 sends a synchronization signal, such as a MRS, to the wireless communications device 240. The wireless communications device 240 obtains synchronization with respect to the source network node 211, 212 with delay Δs. Δs corresponds to a propagation delay between the wireless communications device 240 and the source network node 211, 212.

This action is related to action 301 above and action 501 below.

Action 402

The wireless communications device 240 sends an USS with a timing of the source network node 211, 212 after time interval P1. The USS arrives at the target network node 212 with offset Δs+Δt from the reference timing of the source network node 211, 212. At is the propagation delay between the wireless communications device 240 and the target network node 212.

This action is related to action 302 above and action 502 below.

Action 403

The target network node 212 estimates a timing advance based on the time of reception of the uplink signal in relation to the timeslot boundaries of the target network node 212 and the timing advance becomes the difference between the time of reception and the ideal hypothetical time of reception. The target network node 212 signals the estimated timing advance to the wireless communications device 240.

This action is related to action 305 above and actions 504 and 704 below.

Action 404

The wireless communications device 240 receives a synchronisation signal, such as an MRS, from target network node 212. The wireless communications device 240 shifts its reference timing by D to align its timing with the reference timing of the target network node 212. This is illustrated with the arrow from the dashed line to the solid line associated with the time of reception Tr of the synchronisation signal.

The time difference may be expressed in e.g. microseconds, a combination of milliseconds, microseconds and/or nanoseconds, a number of subframes and/or time slots and/or OFDM symbols and/or fractions of OFDM symbols or any suitable way that represents this time difference.

This action is related to actions 304 and 306 above and actions 504 and 703 below.

Action 405

The wireless communications device 240 applies timing advance (TA1-D) to its transmission timing.

In the general case, where the source network node 211, 212 and the target network node 212 are not synchronised, D may also depend on a difference in timing between the source network node 211, 212 and the target network node 212.

This action is related to action 307 above and action 505 below.

Action 406

The wireless communications device 240 transmits data at a time aligned with its perception of a DL timeslot boundary minus (TA1-D). The data arrives at the target network node 212 with correct timing.

This action is related to action 308 above actions 506 and 705 below.

Figure 5:
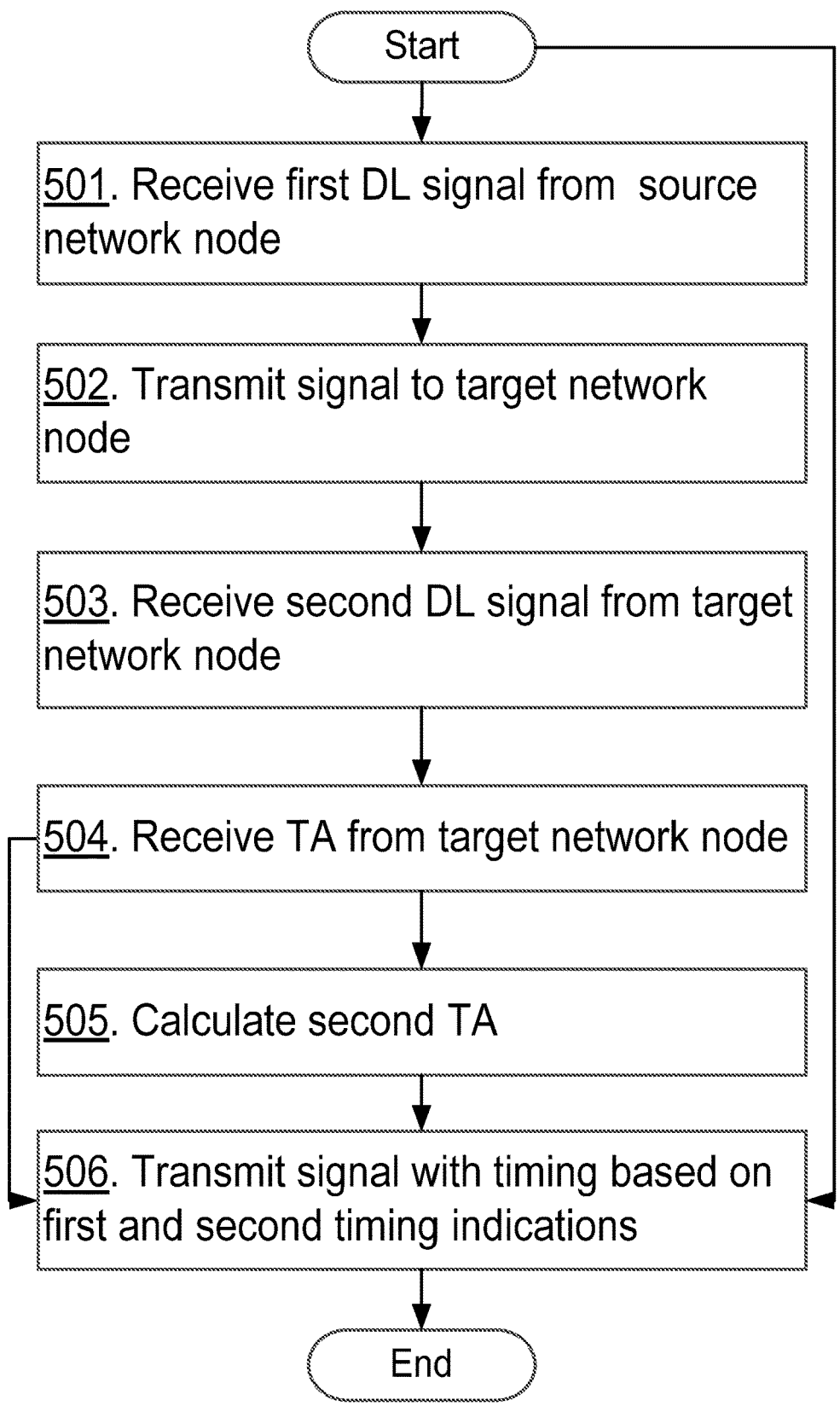
FIG. 5 is a flowchart illustrating embodiments of a method performed by a wireless communications device.

Embodiments for operating the wireless communications device 240, will now be described with reference to the flow chart of FIG. 5.

In embodiments herein timing indications associated with different network nodes are used by the wireless communications device 240. A timing indication associated with a network node, such as the source network node 211, 212 or the target network node 212, may be a timing indication that is associated with the timing of the network node. For example, a timing indication associated with the source network node 211, 212 may be a timing indication that is based on the timing, such as the DL timing, of the source network node 211, 212. Such a timing indication associated with the source network node 211, 212 may further indicate the timing, such as the DL timing, of the source network node 211, 212. Different examples of timing indications will be described below.

A similar description may apply for a timing indication associated with the target network node 212. In some embodiments herein a timing indication associated with the target network node 212 may indicate the timing, such as the DL timing, of the target network node 212 and further indicate a timing parameter, such as a propagation delay or an indication thereof, associated with the wireless communications device 240 and the target network node 212.

Action 501

The wireless communications device 240 may receive a first DL signal transmitted by the source network node 211, 212, possibly as a part of a reference signal, such as an MRS.

Based on this DL signal the wireless communications device 240 may obtain time synchronisation with the source network node 211, 212. For example, the wireless communications device 240 may obtain a timing indication which is associated with the source network node 211, 212. The timing indication may e.g. be associated with the DL timing of the source network node 211, 212 and thus the wireless communications device 240 may obtain DL time synchronisation with the source network node 211, 212.

Examples of the timing indication may comprise e.g. a number of:
  a reference time point
  a number of subframes and/or time slots and/or OFDM symbols and/or time units
  an indication of a subframe and/or time slot and/or OFDM symbol and/or time unit within a sequence of subframes and/or time slots and/or OFDM symbols.

The timing indication may comprise information representing the timing of the source network node 211, 212, such as the DL timing of the source network node 211, 212. For example, the timing indication may comprise information representing a timing reference associated with the source network node 211, 212, e.g. associated with a time of reception of the first DL signal. The time of reception of the first DL signal may pertain to a subframe and/or an OFDM symbol and/or a radio frame and/or a slot and/or a mini-slot and/or time instance, such as a TTI.

This action is related to action 301 above.

Action 502

The wireless communications device 240 may transmit a synchronisation signal to the target network node 212 in response to the first DL signal.

By transmitting the synchronisation signal to the target network node 212 the wireless communications device 240 may obtain a first timing indication. The first timing indication may comprise information representing a first timing reference associated with a time of transmission Tt of the synchronisation signal to the target network node (212.

The time of transmission Tt of the synchronisation signal may be based on the timing reference associated with the source network node 211, 212. For example, the wireless communications device 240 may transmit the synchronisation signal such that a start of a symbol and a start of a subframe and/or a TTI is aligned with the start of the symbol and the start of the subframe and/or the TTI in the received DL transmissions from the source network node 211, 212. This may also be referred to as the communication device 140 follows the timing or a timing reference of the source network node 211, 212.

This action is related to action 302 above and action 701 below.

Action 503

The wireless communications device 240 may receive a second DL signal transmitted by the target network node 212, possibly as a part of a reference signal, such as an MRS.

Based on this second DL signal the wireless communications device 240 may obtain time synchronisation, such as DL time synchronisation, with the target network node 212. For example, the wireless communications device 240 may obtain at least a part of a second timing indication which is associated with the target network node 212.

The second timing indication may e.g. be associated with the DL timing of the target network node 212 and thus the wireless communications device 240 may obtain DL time synchronisation with the target network node 212.

In other words, the second timing indication may comprise information representing the timing of the target network node 212.

For example, the second timing indication may comprise information representing a second timing reference associated with a time of reception Tr of the DL signal from the target network node 212.

The time of reception of the second DL signal may pertain to a subframe and/or an OFDM symbol and/or a radio frame and/or a slot and/or a mini-slot and/or a time instance, such as a TTI.

In general an example of the timing indication being associated with a network node may be that the timing indication represents a time reference or a time interval associated with the network node. For example, the timing indication may represent a reception or transmission time instance in the wireless communications device 240 of a signal associated with the network node, such as a signal from the network node.

This action is related to action 305 above and action 703 below.

Action 504

In some embodiments the wireless communications device 240 receives an indication of a propagation delay TA1 associated with the wireless communications device 240 and the target network node 212. The indication of the propagation delay TA is received from the target access node 212.

In embodiments herein the second timing indication may comprise information representing the indication of the propagation delay TA1.

As mentioned above, in some scenarios this received indication of the propagation delay TA1 does not reflect a correct propagation delay between the wireless communications device 240 and the target network node 212.

This action is related to action 306 above and action 705 below.

Action 505

In some embodiments the wireless communications device 240 calculates an indication of a second propagation delay TA2 associated with the wireless communications device 240 and the target network node 212.

The indication of the second propagation delay TA2 may be an indication of a corrected propagation delay, such as a second timing advance.

The indication of the second propagation delay TA2 and/or the calculation of the indication of the second propagation delay TA2 may be based on the first timing indication and the second timing indication. For example, the wireless communications device 240 may calculate the indication of the second propagation delay TA2 by subtracting a difference between the first timing reference and a calculated, e.g. ideal, time of transmission of the uplink signal, based on the second timing reference from the indication of the propagation delay TA1. As mentioned above, the second timing reference is associated with the time of reception Tr of the DL signal from the target network node 212. The time of reception of the second DL signal may pertain to a subframe and/or an OFDM symbol and/or a radio frame and/or a slot and/or a mini-slot and/or time instance, such as a TTI. Therefore, the calculated time may be aligned with e.g a TTI and/or subframe and/or timeslot boundary of the target network node 212.

In other words, the wireless communications device 240 may calculate and/or obtain the indication of the second propagation delay TA2 by subtracting the first timing reference from the indication of the propagation delay TA1, and adding the calculated time of transmission of the uplink signal, based on the second timing reference to the indication of the propagation delay TA1.

In some embodiments the wireless communications device 240 also adds the difference in timing between the source network node 211, 212 and the target network node 212 as described above in action 405.

This action is related to actions 307 and 405 above.

Action 506

The wireless communications device 240 transmits a signal to the target network node 212. The timing of the signal is based on the first timing indication, and the second timing indication associated with the target network node 212.

As mentioned above the first timing indication may comprise information representing the first timing reference associated with the time of transmission Tt of the synchronisation signal.

As further mentioned above, the second timing indication may comprise information representing the propagation delay TA1 associated with the wireless communications device 240 and the target network node 212. The second timing indication may further comprise information representing the second timing reference associated with the time of reception Tr of the DL signal from the target network node 212.

For example, the wireless communications device 240 may transmit the signal such that a start of a symbol and a start of a subframe and/or a TTI is based on the first timing indication and the second timing indication.

Further, the first timing indication may be associated with the source network node 211, 212. Then the wireless communications device 240 may compensating for the difference in timing between the source network node 211, 212 and the target network node 212, e.g. as expressed by the difference between the first timing reference and the second timing reference, when the wireless communications device 240 transmits the signal. For example, the wireless communications device 240 may transmit the signal such that a start of a symbol and a start of a subframe and/or a TTI is aligned with the start of the symbol and the start of the subframe and/or the TTI in received DL transmissions from the target network node 212 instead of the source network node 211, 212 as is the case if the wireless communications device 240 transmits the signal with a timing based on the second timing indication only.

The difference in timing may be expressed in e.g. the number of subframes and/or time slots and/or OFDM symbols or any suitable way that represents this time difference.

Thus, with embodiments herein the wireless communications device 240 does not have to transmit a second uplink signal, after receiving the response from the target network node 212. This shortens the handover procedure and reduces control signalling load.

This action is related to actions 308 and 406 above.

Figure 6:
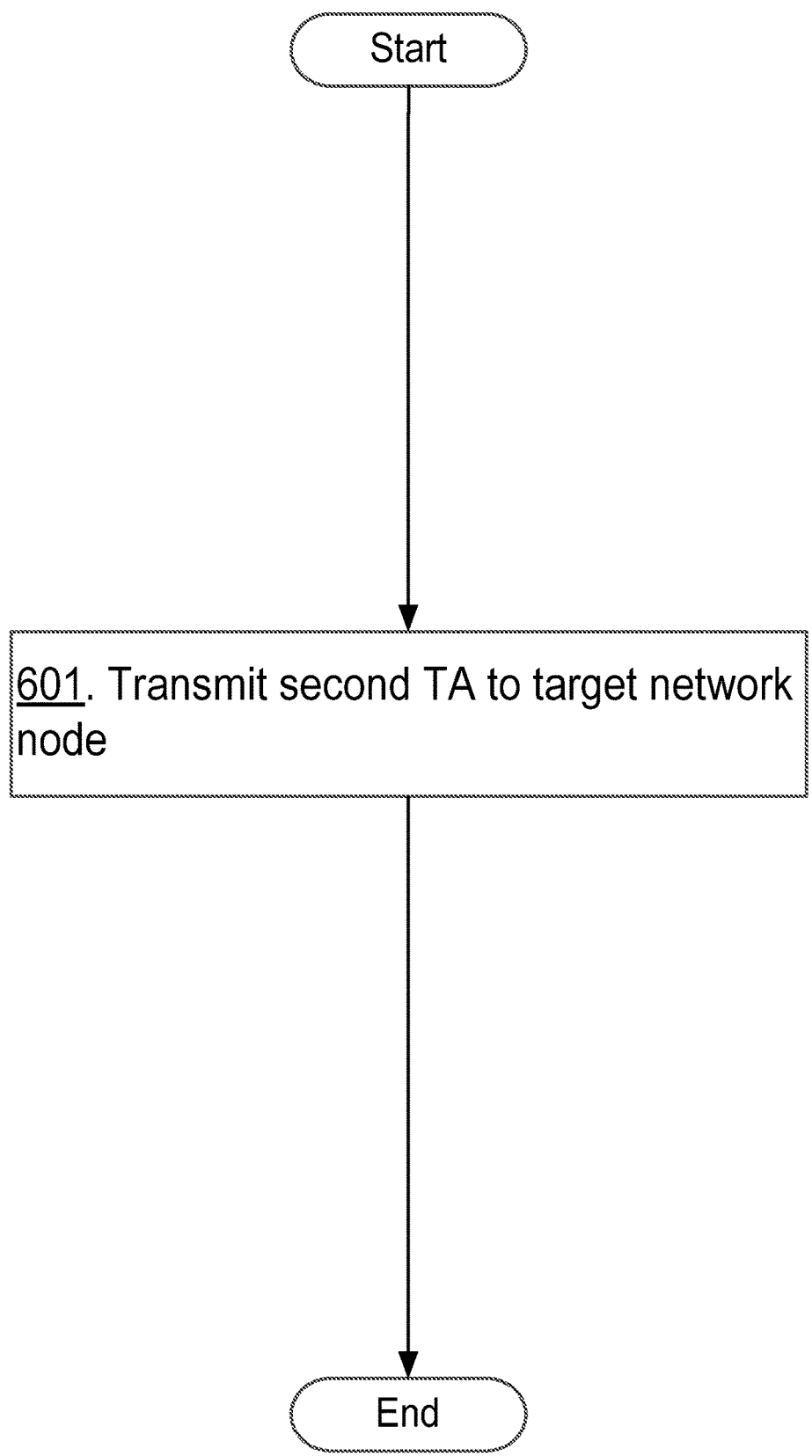
FIG. 6 is a flowchart illustrating further embodiments of a method performed by a wireless communications device.

Some further embodiments for operating the wireless communications device 240, will now be described with reference to the flow chart of FIG. 6.

Action 601

In some further embodiments the wireless communications device 240 transmits an indication to adapt the propagation delay TA1 to the target network node 212.

For example, the wireless communications device 240 may transmit the indication of the second propagation delay TA2 to the target network node 212.

As mentioned above, the indication of the second propagation delay TA2 may be based on the first timing indication and the second timing indication.

By doing so the wireless communications device 240 enables the target network node 212 to overcome any problems associated with using the incorrect first indication of the propagation delay TA1.

This action is related to actions 309 above and action 705 below.

Figure 7:
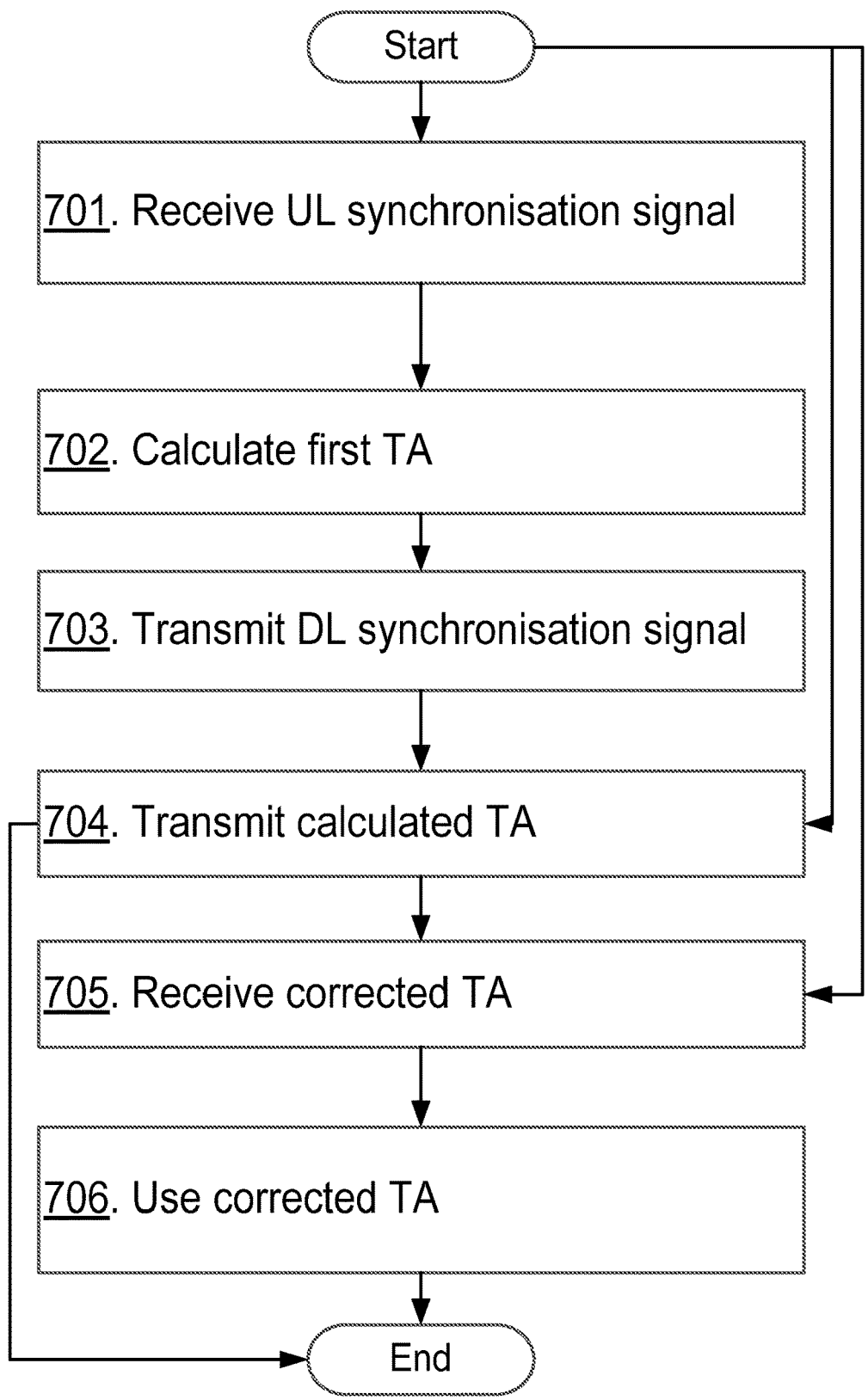
FIG. 7 is a flowchart illustrating embodiments of a method performed by a network node.

Embodiments for operating a network node 212, 213, such as the target network node 212, or the network control node 213, will now be described with reference to the flow chart of FIG. 7.

Action 701

The network node 212, 213 may receive the synchronisation signal from the wireless communications device 240.

This action is related to actions 302, 402 and 502 above.

Action 702

In some embodiments the network node 212, 213 calculates a first propagation delay, associated with the wireless communications device 240 and the target network node 212, based on the synchronisation signal.

This action is related to actions 303 and 403 above.

Action 703

In some further embodiments wherein the network node 212, 213 is the target network node 212, the network node 212, 213 transmits the DL signal, such as the second DL signal, to the wireless communications device 240, in response to the received synchronisation signal. Thus, although other DL synchronisation signals may be always-on and non-specific with regards to which wireless communications device that it is transmitted to, in these embodiments the DL signal from the target network node 212 is targeted specifically to the wireless communications device 240.

These embodiments enable the correction of the indication of the propagation delay at the wireless communications device 240, and also enable a direct link establishment for the UL-based handover.

This action is related to action 606 above.

Action 704

As mentioned above, when the network node 212, 213 is the target network node 212, the network node 212, 213 may transmit an indication of the calculated propagation delay TA1 to the wireless communications device 240.

This action is related to action 507 above.

Action 705

The network node 212, 213, such as the target network node 212, does not know that the calculated propagation delay TA1 is not correct. Therefore, if the network node 212, 213 is not informed of the corrected propagation delay the network node 212, 213 will use the calculated propagation delay in the usual way. For example, if the network node 212, 213 uses the indication of the calculated propagation delay TA1 for estimating the position of the wireless communications device 240 the estimation of the position will be incorrect.

By obtaining an indication of the corrected propagation delay, such as the indication of the second propagation delay TA2, the positioning result will become correct.

Therefore, in some further embodiments the network node 212, 213 receives the indication of the second propagation delay TA2 associated with the wireless communications device 240 and the target network node 212. The indication of the second propagation delay TA2 may be received from the wireless communications device 240.

In other words, the network node 212, 213 receives an indication to adapt the propagation delay TA1.

Thereby, the network node 212, 213 is enabled to use the received indication of the second propagation delay TA2 in place of the indication of the first propagation delay TA1 associated with the wireless communications device 240. The indication of the first propagation delay TA1 corresponds to the indication of the propagation delay which the network node 212, 213 calculated above in action 702. Thus, the indication of the first propagation delay TA1 may also be associated with the target network node 212.

This action is related to actions 309 and 601 above.

Action 706

The network node 212, 213 may use the received indication of the second propagation delay TA2, e.g. in place of the indication of the first propagation delay TA1.

The network node 212, 213 may use the received indication of the second propagation delay TA2 by performing any one or more of:

calculating a distance to the wireless communications device 240 based on the received indication of the second propagation delay TA2, transmitting the received indication of the second propagation delay TA2 to the network control node 213, and transmitting 310 an indication of an adjustment of the indication of the second propagation delay TA2 to the wireless communications device 240.

By transmitting the received indication of the second propagation delay TA2 to the network control node 213 the target network node 212 may e.g. enable correct calculation of a position of the wireless communications device 240 in the network control node 213.

For example, the position of the wireless communications device 240 may be calculated through triangulation involving multiple network nodes. Then it is suitable that the network control node 213 communicates with the involved multiple network nodes, such as the target network node 212, to collect data and then calculate the position.

The indication of the second propagation delay TA2 may be used e.g. in combination with an estimate of a direction towards the wireless communications device 240. The direction may be based on a direction of beamformed transmission towards the wireless communications device 240 or the direction of arrival of transmission from the wireless communications device 240.

As mentioned above, in some embodiments the network node 212, 213 adjusts the indication of the second propagation delay TA2, such as the timing advance, through relative adjustment instructions to the wireless communications device 240. Such adjustment instructions, e.g. increase by X or decrease by X, correspond to a control principle of timing advance used in LTE.

The above uses of the received indication of the second propagation delay TA2 are merely non-limiting examples.

In some embodiments the network node 212, 213 first replaces the calculated indication of the propagation delay TA1 with the received indication of the second propagation delay TA2.

In conclusion, in the scenario described herein the transmission of uplink signals for synchronisation follows the DL timing of the source network node 211, 212, while, for a correct timing advance, it should be tied to the yet unknown DL timing of the target network node 212. To overcome the above described problems embodiments herein leverages the fact that the wireless communications device 240 has synchronization parameters, in particular the DL timing reference, available w.r.t. the source network node 211, 212 prior to the USS transmission and subsequently, after receiving the response from the target network node 212, also w.r.t. the target network node 212. This enables the wireless communications device 240 to compensate for the error in the timing advance received from the target network node 212.

To this end, the wireless communications device 240 may transmit an uplink signal, e.g. the USS, in accordance with the timing of the downlink synchronization with the source network node 211, 212. The selected target network node 212 may calculate the timing advance for the wireless communications device 240 as if the uplink signal was transmitted based on the downlink synchronization of the target network node 212. Further, the target network node 212 may transmit the calculated timing advance to the wireless communications device 240 in a message responding to the uplink signal.

The wireless communications device 240 may remember the downlink timing reference associated with the source network node 211, 212, which was the actual timing of the transmission of the uplink signal. After receiving the response from the target network node 212, including the DL synchronization signal, the wireless communications device 240 also obtains the downlink timing reference of the target network node 212. The wireless communications device 240 may thus compensate for the error in the timing advance received from the target network node 212, and it may further calculate the actual timing advance for the target network node 212 as the received timing advance minus the difference between the DL timing of the source network node 211, 212 and the target network node 212. The time difference may be expressed in e.g. microseconds, milliseconds, a number of subframes and/or time slots and/or OFDM symbols or any suitable way that represents this time difference.

Figure 8:
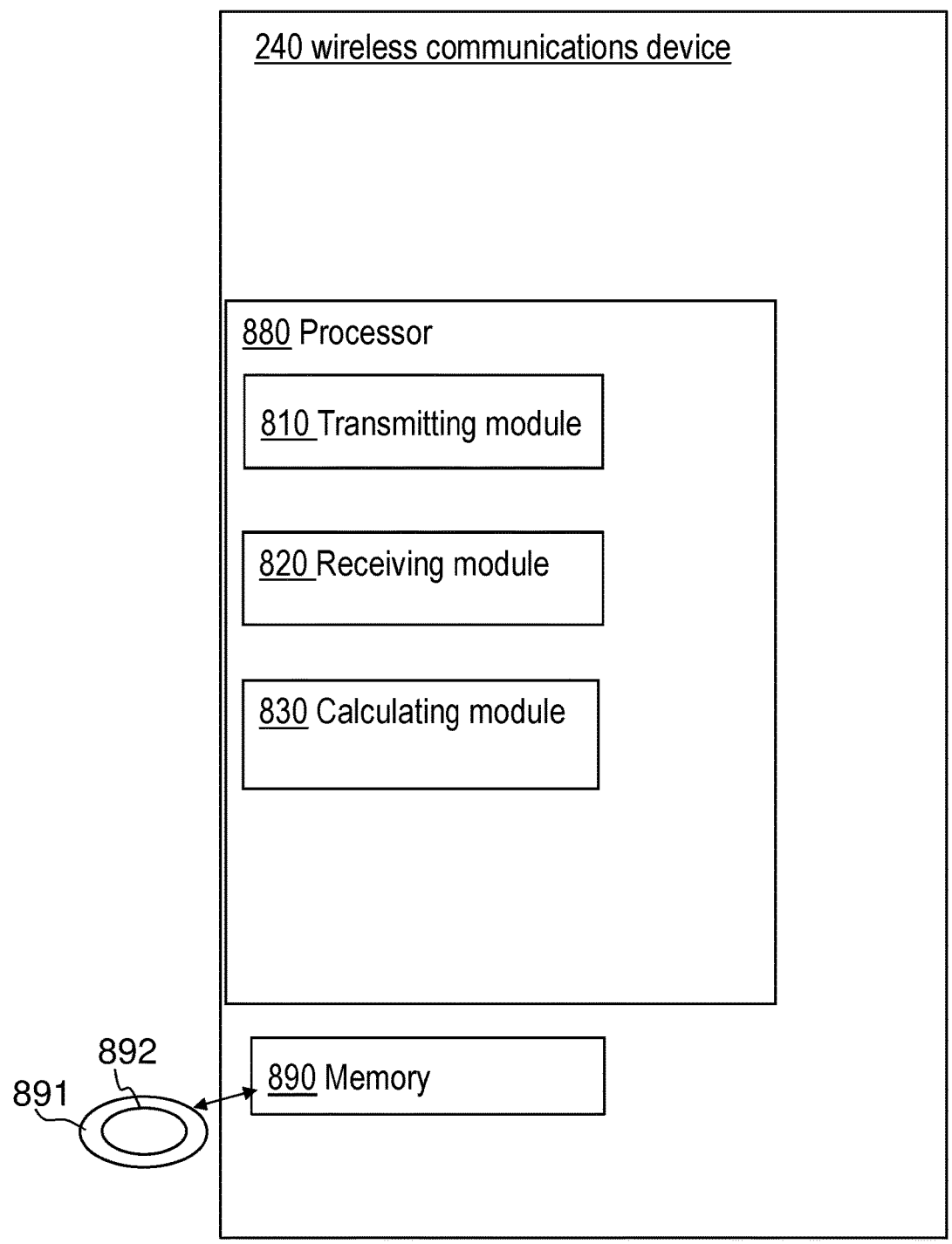
FIG. 8 is schematic block diagram illustrating embodiments of a wireless communications device.

To perform the method actions for operating the wireless communications device 240 described above in relation to FIG. 5, the wireless communications device 240 may comprise the following arrangement depicted in FIG. 8.

The wireless communications device 240 is configured to, e.g. by means of a transmitting module 810 configured to, transmit the signal, to the target network node 212, with the timing that is based on the first timing indication, and the second timing indication associated with the target network node 212.

The first timing indication may comprises information representing the first timing reference associated with the time of transmission Tt of the synchronisation signal to the target network node 212. The synchronisation signal is transmitted from the wireless communications device 240.

The second timing indication may comprise information representing the indication of the propagation delay TA1 associated with the wireless communications device 240 and the target network node 212. The second timing indication may further comprise information representing the second timing reference associated with the time of reception Tr of the DL signal from the target network node 212.

That is, the second timing indication may comprise information representing the propagation delay TA and the second timing reference.

In some embodiments the first timing indication is associated with the source network node 211, 212.

The transmitting module 810 may be implemented by a processor 880 in the wireless communications device 240.

The wireless communications device 240 may be further configured to, e.g. by means of the transmitting module 810 configured to, transmit the synchronisation signal to the target network node 212. The wireless communications device 240 may transmit the synchronisation signal in response to the first DL signal.

In some embodiments the time of transmission Tt of the synchronisation signal is based on the timing reference associated with the source network node 211, 212.

The wireless communications device 240 may be further configured to, e.g. by means of a receiving module 820 configured to, receive the indication of the propagation delay TA1 from the target access node 212.

The receiving module 820 may be implemented by the processor 880 in the wireless communications device 240.

In some embodiments the wireless communications device 240 is further configured to, e.g. by means of a calculating module 830 configured to, obtain the timing at least in part, by subtracting the first timing reference from the indication of the propagation delay TA1, and adding the calculated time of transmission of the uplink signal to the indication of the propagation delay TA1. The calculated time of transmission of the uplink signal is based on the second timing reference.

The calculating module 830 may be implemented by the processor 880 in the wireless communications device 240.

The wireless communications device 240 may be further configured to, e.g. by means of the transmitting module 810 configured to, transmit the indication of the second propagation delay TA2 to the network node 212, 213.

Figure 9:
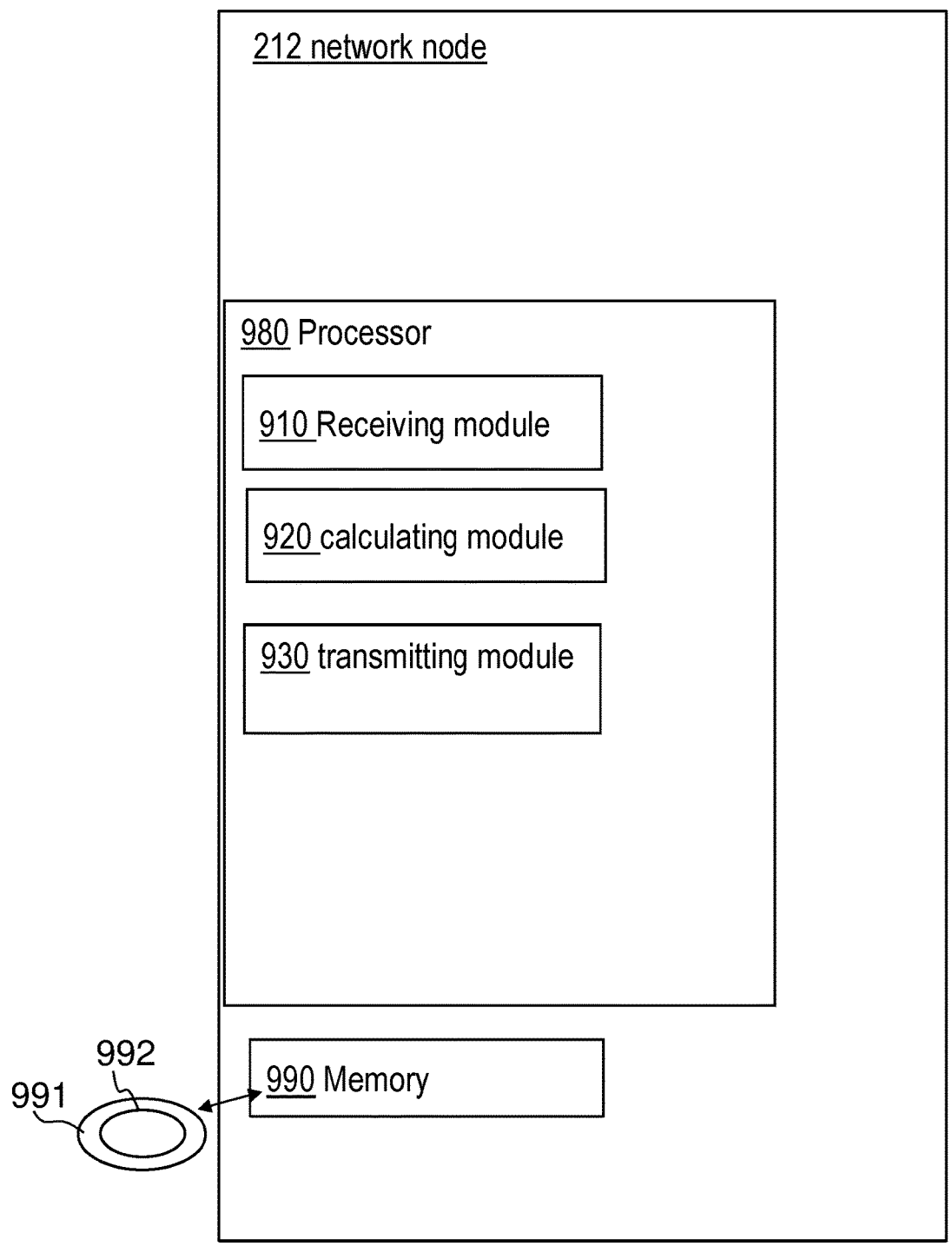
FIG. 9 is schematic block diagram illustrating embodiments of a network node.

To perform the method actions for operating the network node 212, 213 described above in relation to FIG. 7, the network node 212, 213 may comprise the following arrangement depicted in FIG. 9.

The network node 212, 213 is configured to, e.g. by means of a receiving module 910 configured to, receive from the wireless communications device 240, the indication of the second propagation delay TA2 associated with the wireless communications device 240 and the target network node 212.

Thereby the network node 212, 213 is enabled to use the received indication of the second propagation delay TA2 in place of the indication of first propagation delay TA1 associated with the wireless communications device 240.

The receiving module 910 may be implemented by a processor 980 in the network node 212, 213.

In some embodiments the network node 212, 213 is further configured to, e.g. by means of a calculating module 920 or a transmitting module 930 configured to, use the received indication of the second propagation delay TA2.

For example, the network node 212, 213 may be further configured to, e.g. by means of the calculating module 920 configured to, calculate the distance to the wireless communications device 240 based on the received indication of the second propagation delay TA2.

In some other embodiments the network node 212, 213 is further configured to, e.g. by means of the transmitting module 930 configured to, transmit the received indication of the second propagation delay TA2 to the network control node 213.

The network node 212, 213 may be further configured to, e.g. by means of the transmitting module 930 configured to, transmit an indication of an adjustment of the indication of the second propagation delay TA2 to the wireless communications device 240.

The calculating module 920 and/or the transmitting module 930 may be implemented by the processor 980 in the network node 212, 213.

In some further embodiments the network node 212, 213 is further configured to, e.g. by means of the receiving module 910 configured to, receive the synchronisation signal from the wireless communications device 240.

The network node 212, 213 may further be configured to, e.g. by means of the calculating module 920 configured to, calculate the first propagation delay based on the synchronisation signal.

In some further embodiments the network node 212, 213 is further configured to, e.g. by means of the transmitting module 930 configured to, transmit, to the wireless communications device 240, the DL signal in response to the received synchronisation signal.

In yet some further embodiments the network node 212, 213 is further configured to, e.g. by means of the transmitting module 930 configured to, transmit, to the wireless communications device 240, the indication of the calculated first propagation delay TA1.

The embodiments herein may be implemented through one or more processors, such as the processors 880 in the wireless communications device 240 depicted in FIG. 8, and the processor 980 in the network node 212, 213 depicted in FIG. 9 together with computer program code for performing the functions and actions of the embodiments herein. The program code mentioned above may also be provided as a computer program product 891, 991 for instance in the form of a data carrier carrying computer program code 892, 992 for performing the embodiments herein when being loaded into the wireless communications device 240, and the network node 212, 213. One such carrier may be in the form of a CD ROM disc. It is however feasible with other data carriers such as a memory stick. The computer program code may furthermore be provided as pure program code on a server and downloaded to the wireless communications device 240, and the network node 212, 213.

Thus, the methods according to the embodiments described herein for the wireless communications device 240 and the network node 212, 213 may be implemented by means of a computer program product, comprising instructions, i.e., software code portions, which, when executed on at least one processor, cause the at least one processor to carry out the actions described herein, as performed by the wireless communications device 240, and the network node 212, 213. The computer program product may be stored on a computer-readable storage medium. The computer-readable storage medium, having stored there on the computer program, may comprise the instructions which, when executed on at least one processor, cause the at least one processor to carry out the actions described herein, as performed by the wireless communications device 240, and the network node 212, 213. In some embodiments, the computer-readable storage medium may be a non-transitory computer-readable storage medium.

The wireless communications device 240, and the network node 212, 213 may further each comprise a memory 890, 990 comprising one or more memory units. The memory 890, 990 is arranged to be used to store obtained information such as MRSs, timing advances, i.e. TAs, synchronisation signals, DL signals, UL signals, measurements of signal, timing indication, reference timing, time of transmission, time of reception, configurations and applications etc. to perform the methods herein when being executed in the wireless communications device 240, and the network node 212, 213.

Those skilled in the art will also appreciate that the different modules described above may refer to a combination of analog and digital circuits, and/or one or more processors configured with software and/or firmware, e.g. stored in the memory, that when executed by the one or more processors, such as the processors in the wireless communications device 240, and the network node 212, 213 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope.

Although specific terms may be employed herein, they are used in a generic and descriptive sense only and not for purposes of limitation.

Therefore, the above embodiments should not be taken as limiting the scope, which is defined by the appending claims.

Note that although terminology from 5G/NR has been used in this disclosure to exemplify the embodiments herein, this should not be seen as limiting the scope of the embodiments herein to only the aforementioned system. Other wireless systems may also benefit from exploiting the ideas covered within this disclosure.

Also note that terminology such as a first network node and a second network node or source network node and target network node should be considered to be non-limiting and does in particular not imply a certain hierarchical relation between the two.

The invention claimed is:

1. A method performed by a wireless communications device configured for operation in a wireless communications network, the method comprising:
   transmitting an uplink synchronization signal for a second network node, using a first signal timing referenced to a downlink timing of a first network node;

receiving one or more downlink transmissions from the second network node, sent in response to reception of the uplink synchronization signal at the second network node, the one or more downlink transmissions providing a synchronization reference for determining a downlink timing of the second network node and conveying a timing advance value calculated by the second network node for the device in dependence on a reception timing of the uplink synchronization signal at the second network node;

determining the downlink timing of the second network node from the one or more downlink transmissions;

compensating the timing advance value for misalignment between the downlink timing of the first network node and the downlink timing of the second network node; and transmitting an uplink signal for the second network node having a second signal timing that references the compensated timing advance value to the downlink timing of the second network node.

2. The method of claim 1, further comprising performing the method in conjunction with the device being handed over from the first network node as a source network node, to the second network node as a target network node, and wherein the downlink timing of the source network node is known to the device based, based on the device having synchronized with the source base station.

3. The method of claim 1, wherein transmitting the uplink signal for the second network node comprises performing a data transmission using the second signal timing.

4. The method of claim 1, further comprising transmitting an indication of the compensated timing advance value for reception by the second network node, thereby enabling the second network node to reference a subsequent timing advance adjustment to the compensated timing advance value rather than the timing advance value previously conveyed to the device.

5. The method of claim 1, wherein compensating the timing advance value for misalignment between the downlink timing of the first network node and the downlink timing of the second network node comprises, responsive to determining that the difference between a transmission time of the uplink synchronization signal and a reception time of the one or more downlink transmissions does not represent an integer multiple of a defined transmission time unit:

calculating an adjustment value by adding to the transmission time an integer number of the defined transmission time unit, such that the adjustment value lies at the integer position just before or just after the reception time;

calculating a misalignment value by subtracting the adjustment value from the reception time; and subtracting the misalignment value from the timing advance value to obtain the compensated timing advance value.

6. The method of claim 5, wherein the defined transmission time unit is a subframe, and wherein the first and second network nodes use the same timing definitions for subframes and for corresponding frames, each frame containing a defined number of subframes.

7. The method of claim 1, wherein compensating the timing advance value for the difference between the downlink timing of the first network node and the downlink timing of the second network node comprises, responsive to determining that the difference between a transmission time of the uplink synchronization signal and a reception time of the one or more downlink transmissions represent an integer multiple of a defined transmission time unit, determining that no misalignment exists between the downlink timing of the first network node and the second network node, such that the compensating step applies zero compensation to the timing advance value and the compensated timing advance value is the timing advance value.

8. A wireless communications device configured for operation in a wireless communications network, the device comprising:

communications circuitry;

processing circuitry configured to:

transmit, via the communications circuitry, an uplink synchronization signal for a second network node, using a first signal timing referenced to a downlink timing of a first network node;

receive, via the communications circuitry, one or more downlink transmissions from the second network node, sent in response to reception of the uplink synchronization signal at the second network node, the one or more downlink transmissions providing a synchronization reference for determining a downlink timing of the second network node and conveying a timing advance value calculated by the second network node for the wireless communications device in dependence on a reception timing of the uplink synchronization signal at the second network node;

determine the downlink timing of the second network node from the one or more downlink transmissions;

compensate the timing advance value for misalignment between the downlink timing of the first network node and the downlink timing of the second network node; and transmit, via the communications circuitry, an uplink signal for the second network node having a second signal timing that references the compensated timing advance value to the downlink timing of the second network node.

9. The device of claim 8, wherein the processing circuitry is configured to carry out the operations set forth in claim 8 in conjunction with being handed over from the first network node as a source network node, to the second network node as a target network node, and wherein the downlink timing of the source network node is known to the device, based on the device having synchronized with the source base station.

10. The device of claim 8, wherein the processing circuitry is configured to transmit a data signal as said uplink signal.

11. The device of claim 8, wherein the processing circuitry is configured to transmit, via the communication circuitry, an indication of the compensated timing advance value for reception by the second network node, thereby enabling the second network node to reference a subsequent timing advance adjustment to the compensated timing advance value rather than the timing advance value previously conveyed to the device.

12. The device of claim 8, wherein the processing circuitry is configured to compensate the timing advance value for misalignment between the downlink timing of the first network node and the downlink timing of the second network node by, responsive to determining that the difference between a transmission time of the uplink synchronization signal and a reception time of the one or more downlink transmissions does not represent an integer multiple of a defined transmission time unit:

calculating an adjustment value by adding to the transmission time an integer number of the defined transmission time unit, such that the adjustment value lies at the integer position just before or just after the reception time;

calculating a misalignment value by subtracting the adjustment value from the reception time; and subtracting the misalignment value from the timing advance value to obtain the compensated timing advance value.

13. The device of claim 12, wherein the defined transmission time unit is a subframe, and wherein the first and second network nodes use the same timing definitions for subframes and for corresponding frames, each frame containing a defined number of subframes.

14. The device of claim 8, wherein the processing circuitry is configured to compensate the timing advance value for the difference between the downlink timing of the first network node and the downlink timing of the second network node by, responsive to determining that the difference between a transmission time of the uplink synchronization signal and a reception time of the one or more downlink transmissions represents an integer multiple of a defined transmission time unit, determining that no misalignment exists between the downlink timing of the first network node and the second network node, such that the processing circuitry applies zero compensation to the timing advance value and the compensated timing advance value is the timing advance value.

15. A method performed by a network node configured for operation in a wireless communication network, the method comprising:

receiving an uplink synchronization signal from a wireless communications device, the uplink synchronization signal having a first signal timing referenced to a downlink timing of another network node;

determining a timing advance value based on a reception time of the uplink synchronization signal in relation to a downlink timing of the network node;

performing one or more downlink transmissions for the device, the one or more downlink transmissions conveying the timing advance value and providing a synchronization reference for the device for determining the downlink timing of the network node;

receiving a compensated timing advance value from the device, the compensated timing advance value being the timing advance value determined by the network node but compensated by the device for misalignment between the downlink timing of the network node and the downlink timing of the other network node; and making a subsequent timing advance adjustment for the device based on the compensated timing advance value.

16. The method of claim 15, further comprising carrying out the method of claim 11 in conjunction with the device being handed over from the other network node as a source node, to the network node as a target network node.

17. A network node configured for operation in a wireless communication network, the network node comprising:

communication circuitry; and processing circuitry configured to:

receive, via the communication circuitry, an uplink synchronization signal from a wireless communications device, the uplink synchronization signal having a first signal timing referenced to a downlink timing of another network node;

determine a timing advance value based on a reception time of the uplink synchronization signal in relation to a downlink timing of the network node;

perform one or more downlink transmissions for the device via the communication circuitry, the one or more downlink transmissions conveying the timing advance value and providing a synchronization reference for the device for determining the downlink timing of the network node;

receive, via the communication circuitry, a compensated timing advance value from the device, the compensated timing advance value being the timing advance value determined by the network node but compensated by the device for misalignment in the downlink timing of the network node and the downlink timing of the other network node; and make a subsequent timing advance adjustment for the device based on the compensated timing advance value.

18. The network node of claim 17, wherein the processing circuitry is configured to carry out the operations set forth in claim 13 in conjunction with the device being handed over from the other network node as a source node, to the network node as a target network node.

* * * * *